United States Patent
Yamate et al.

(10) Patent No.: US 7,215,416 B2
(45) Date of Patent: May 8, 2007

(54) METHOD FOR MEASURING USING OPTICAL FIBER DISTRIBUTED SENSOR

(75) Inventors: Tsutomu Yamate, Yokohama (JP); Robert J. Schroeder, Newtown, CT (US); Rogerio T. Ramos, North Baddesley (GB); Oliver C. Mullins, Ridgefield, CT (US)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 11/450,327

(22) Filed: Jun. 12, 2006

(65) Prior Publication Data

US 2006/0239330 A1    Oct. 26, 2006

Related U.S. Application Data (60) Continuation of application No. 11/055,062, filed on Feb. 11, 2005, now abandoned, which is a division of application No. 10/176,858, filed on Jun. 21, 2002, now abandoned.

(51) Int. Cl.
   *G01N 21/00* (2006.01)
(52) U.S. Cl. .................................... 356/73.1
(58) Field of Classification Search .............. None
   See application file for complete search history.

(56) References Cited

U.S. PATENT DOCUMENTS

| | | | |
|---|---|---|---|
| 4,823,166 A | 4/1989 | Hartog et al. | |
| 4,859,065 A * | 8/1989 | Bibby ........................ | 356/45 |
| 5,054,935 A | 10/1991 | Tanabe et al. | |
| 5,102,232 A | 4/1992 | Tanabe et al. | |
| 5,113,277 A | 5/1992 | Kunugiyama et al. | |
| 5,217,306 A * | 6/1993 | Wada ........................ | 374/161 |
| 5,380,995 A | 1/1995 | Udd et al. | |
| 5,401,956 A | 3/1995 | Dunphy et al. | |
| 5,592,282 A * | 1/1997 | Hartog ........................ | 356/44 |
| 5,765,948 A | 6/1998 | Sai | |
| 5,825,804 A | 10/1998 | Sai | |
| 5,841,131 A | 11/1998 | Schroeder et al. | |
| 6,218,661 B1 | 4/2001 | Schroeder et al. | |
| 6,246,048 B1 | 6/2001 | Ramos et al. | |
| 6,268,911 B1 | 7/2001 | Tubel et al. | |
| 6,271,766 B1 | 8/2001 | Didden et al. | |
| 6,304,686 B1 | 10/2001 | Yamate et al. | |
| 6,305,227 B1 | 10/2001 | Wu et al. | |
| 6,524,001 B1 | 2/2003 | Fredin et al. | |
| 6,542,228 B1 | 4/2003 | Hartog | |
| 6,807,324 B2 | 10/2004 | Pruett | |

FOREIGN PATENT DOCUMENTS

| | | |
|---|---|---|
| EP | 0 457 941 | 11/1991 |
| GB | 2 210 451 | 6/1989 |
| WO | WO 00/39548 | 7/2000 |
| WO | WO 02/39068 | 5/2002 |

OTHER PUBLICATIONS

Hartog A.H., "Distributed fiber-optic sensors". XP 002260434, Grattan K.T.V., Meggitt B.T., "Optical Fiber Sensor Technology". Chapman & Hall, London. 1995.

(Continued)

*Primary Examiner*—Tu T. Nguyen
(74) *Attorney, Agent, or Firm*—Osha Liang LLP; Dona C. Edwards; Jaime A. Castano (57) ABSTRACT

Methods for calibrating and making measurements using fiber optic sensors are disclosed using backscattered wavelengths and independent sensors. The disclosure sets outs methods applicable with fiber optic sensors either in a deployed in a loop and in a linear configuration and useful for measurements including temperature.

5 Claims, 9 Drawing Sheets

OTHER PUBLICATIONS

Iida O, et al., "Expansion of measuring range for fiber-optic distributed temperature sensor and applications to commercial plants", Instrumentation and Measurement Technology Conference, 1994, IMTC/94. Conference Proceedings, 10th Anniversary, Advanced Technologies in I&M., 1994 IEEE, Hamamatsu, Japan May 10-12, 1994, New York, NY, USA, IEEE, May 10, 1994, pp. 265-268, XP010122109.

T. Wakami, M. Nishimura, S. Tanaka, R. Hata and H. Nishima, "Development of an Optical Fiber Distributed Temperature Sensor for Long Distances", Sumitomo Electric Technical Review No. 43, pp. 40-44, 1997.

Opotek Tunable Laser System, www.opotak.com, 2002.

Specification for fiber-optics distributed temperature sensing system Sumi-Thermo, Spec. No. :PLS00-019, Sumitomo Electronic Industries, LTD, no date.

Y-J. Rao, "In-fiber Bragg grating sensors". Meas, Sci. Technol. 8, pp. 355-375, 1997.

Spectral attenuation for 50/125 Multi Mode Graded-Index Fiber BF0443, SpecTran catalog. Doc. #0019-9711, no date.

WA-7000 Multi-Line Wavemeter Operating Manual, Burleigh, Aug. 1999.

As discussed with Examiner Gregory Toatley, Jr., references in boldface are not submitted herewith, but are available in the file of parent U.S. Appl. No. 10/176,858.

Bryant, I. D., et al., *"Real-Time Monitoring and Control of Water Influx to a Horizontal Well Using Advanced Completion Equipped with Permanent Sensors"*; (Society of Petroleum Engineers) SPE Inernational, SPE 77522, presented at the SPE Annual Technical Conference and Exhibition held in San Antonio, Texas, Sep. 29-Oct. 2, 2002. (This document was cited in the IDS filed with the referenced application on Jun. 12, 2006, but was omitted as an attachment to the IDS.) (16 pages).

* cited by examiner

METHOD FOR MEASURING USING OPTICAL FIBER DISTRIBUTED SENSOR

CROSS-REFERENCE TO RELATED APPLICATIONS

This application is a continuation of application Ser. No. 11/055,062 filed Feb. 11, 2005, abandoned, which is a divisional of application Ser. No. 10/176,858 filed Jun. 21, 2002, abandoned.

BACKGROUND OF THE INVENTION

1. Field of the Invention

The invention relates to fiber optic distributed sensors and methods of measuring parameters and calibrating parameter measurements made using optical fiber distributed sensors. In particular, methods of measuring temperature and calibrating temperature measurements made using fiber optic distributed temperature sensors are disclosed.

2. Description of Related Art

Optical fibers typically include a core, a concentric cladding surrounding the core, a concentric protective jacket or buffer surrounding the cladding. Generally the core is made of transparent glass or plastic possessing a certain index of refraction and the cladding is made of transparent glass or plastic possessing a different index of refraction. The relative refractive indices of the core and the cladding largely determine the function and performance of the optical fiber. As a beam of light is introduced into the optical fiber, the velocity and direction of the light changes at the interface of media with different refraction indices. The angles of reflection and refraction can be predicted using Snell's law if the refractive indices of both media are known. It is known to alter the media with their respective refraction indices to provide optical fiber with certain light propagating characteristics. Typically, for minimal power loss, it is desirable for the light to propagate mainly through the core of the optical fiber. In addition to refraction indices, other factors that affect the propagation of the light through the fiber optic core include the dimensions of the core and the cladding, the wavelength of the light, the magnetic field vectors of the light and the electrical field vectors of the light, the configuration of the optical fiber, the presence of imperfections, and environmental effects such as bends, twists, creases or folds.

One advantage of optical fiber is the ability to determine information concerning a parameter of interest relating to environmental effects along the length of a fiber. Measurements are made by introducing optical energy into an optical fiber and receiving backscattered light returned from various distances along the optical fiber. In order to relate the characteristics of backscattered light to the parameter of interest at a particular distance, it is known to use optical time domain reflectometry (OTDR) to determine the distance from which the light is returned along the fiber is required. Such methods are known and described in U.S. Pat. No. 4,823,166 to Hartog et al. and U.S. Pat. No. 5,592,282 to Hartog, both of which are incorporated herein in the entirety by reference. In OTDR, a pulse of optical energy is introduced to the optical fiber and the backscattered optical energy returning from the fiber is observed as a function of time, which is proportional to distance along the fiber from which the backscattered light is received. This backscattered light includes the Rayleigh spectrum, the Brillouin spectrum, and the Raman spectrum. The Raman spectrum is the most temperature sensitive with the intensity of the spectrum varying with temperature, although all three types of backscattered light contain temperature information.

Fiber optic (FO) sensors employ the fact that environmental effects can alter the amplitude, phase, frequency, spectral content, or polarization of light propagated through an optical fiber. Fiber optics sensors can be classified as intrinsic or extrinsic. Intrinsic sensors measure ambient environmental effects by relying on the properties of the optical fiber only while extrinsic sensors are coupled to another device to translate environmental effects into changes in the properties of the light in the fiber optic. Intrinsic fiber optic distributed temperature sensors (DTS) are known. One such device is disclosed in U.S. Pat. No. 5,825,804 to Sai, incorporated herein in its entirety by reference. Such sensors may be multimode fiber (MMF) or single mode fiber (SMF). Single mode optical fibers have a relatively small diameter and support only one spatial mode of propagation. Multimode fibers have a core with a relatively large diameter and permit non-axial rays or modes to propagate through the core.

Typically the Raman spectrum is used to measure temperature, the temperature distribution is calculated based on the ratio of between the Stokes component and the anti-Stokes component of the Raman spectrum of the backscattered light as follows:

$$\frac{I_{as}}{I_s} = \beta \exp\left[\frac{-hc\upsilon}{kT}\right] \quad (1)$$

where $\beta$ is a coefficient, h is Plank's constant, $\upsilon$ is Raman shifted wavelength number, k is Bolzmann constant, T is absolute temperature, $I_{as}$ is the anti-Stokes component and $I_s$ is the Stokes component. The Stokes/anti-Stokes ratio $I_s/I_{as}$ is designated as SAR. Using Equation 1, the temperature at the position along the optical fiber from which the backscattering occurred can be determined.

To measure temperature along a fiber optic (FO) distributed sensor, optical energy is introduced into the fiber and backscattered light is excited. The backscattered signal (light) contains information relating to the point along the fiber from which the backscattering occurred. This light is sensed and processed as a time-sequence signal. A one-dimensional temperature distribution along the optical fiber is thus measured. Within the backscattered light, typically the Raman spectrum is transferred by an optical directional coupler to a measuring apparatus, whereby the Stokes light and the anti-Stokes light in the Raman backscattered light are separated by a filter, detected, and converted to electrical signals in proportion to their associated amplitudes by respective photo-electric converters. It is known to calculate temperature distribution based on the ratio between these components of backscattered light, or alternatively based on measurement of only one component of the Raman spectrum of backscattered light.

In optical fiber, there are losses that can affect backscattered Stokes and anti-Stokes wavelengths differently. For example, the optical energy introduced into the optical fiber naturally undergoes attenuation during transmission through the fiber. Also there may losses owing to environmental stresses like bends or connections. These losses subtract differently from the measured backscattered Stokes and anti-Stokes intensities. These differences in fiber attenuation between Stokes and anti-Stokes wavelengths must be addressed to avoid error in the measured parameter along the FO distributed sensor.

Parameter measurements obtained using a FO distributed sensor comprise the true parameter measurement and a measurement error caused by deleterious influences on the fiber optic distributed sensor. By way of example but not limitation, such deleterious influences can include energy losses due to splices or bends, strains in the fiber, changes in attenuation resulting from aging or environmental conditions, drift in measurements over time, hydrogen ingression, or environmental conditions. Such error is cumulative with distance along a fiber. While certain measurement errors can be predicted based on manufacturer or material calibration information, baseline testing, or tracking of known elements such as splice location, the occurrence and effect of other deleterious influences and the measurement error they introduce is difficult to assess. It is known to deploy an optical fiber in a borehole to obtain distributed measurements of borehole parameters and it can be appreciated that accounting for these deleterious influences and their associated measurement error is particularly difficult when the fiber optic distributed sensor is deployed in a borehole. A need exists for a method of calibrating FO distributed sensors and a particular need exists for a method of calibrating optical fibers deployed in a borehole for use in distributed temperature measurements.

One method for correction is presented in U.S. Pat. No. 5,102,232 issued to Tanabe et al. However this method requires maintaining an optical fiber temperature reference point at a known temperature. Maintaining such a reference point may not be feasible. For example, in downhole application where an optical fiber is disposed in a borehole, it may not be possible to maintain a reference point at a known temperature.

Robust methods for accurately determining parameters using a FO distributed sensor measurements in a borehole are needed. The accuracy of parameter measurements can be limited by the algorithm or methodology used to account for variations in the measurements and such limitations in methodology can exist regardless of whether an optical fiber is deployed in a borehole in a linear or loop configuration. Methods of calibrating parameter measurements obtained using a FO distributed sensor are useful. Methods of measuring a parameter obtained using a FO distributed sensor that include calibration of the parameter measurement are also useful. A particular need exists for methods of calibrating temperature measurements obtained using a fiber optic distributed temperature sensor (FO-DTS) and methods of measuring temperature using a FO-DTS that include calibration of the measurements.

BRIEF SUMMARY OF THE INVENTION

The present invention comprises methods of calibrating a parameter measurement obtained using a fiber optic distributed sensor and methods of making a parameter measurement that include calibration.

One embodiment of the present invention is a method of measuring a parameter using a FO distributed sensor comprising the steps of: measuring a parameter of interest along a FO distributed sensor; measuring said parameter of interest using an independent sensor located along the length of the FO distributed sensor; determining the difference in the parameter measurement $\Delta T_1$ between the parameter measurement made by the independent sensor and the parameter measurement made by the distributed sensor at the location of the independent sensor; and adjusting the parameter measurements determined by the FO distributed sensor by $\Delta T_1$. In an embodiment, the FO distributed sensor is deployed in a borehole. In a particular embodiment, the independent sensor is placed at a location within an area of particular interest in a borehole. In one embodiment, the parameter of interest is temperature, the FO distributed sensor is a fiber optic distributed temperature sensor (FO-DTS), and the $\Delta T_1$ is the difference between the temperature measured by an independent temperature sensor and the temperature measured by a FO-DTS.

Another embodiment of the present invention is a method of calibrating a fiber optic distributed sensor, comprising the steps of: measuring a parameter of interest along a FO distributed sensor; measuring said parameter using an independent sensor located along the length of the FO distributed sensor; determining the difference $\Delta T_1$ between the parameter measurement made by the independent sensor and the parameter measurement made by the distributed sensor at the location of the independent sensor; and using $\Delta T_1$ to adjust the parameter measurements determined by the optical fiber distributed sensor. In a further embodiment, the FO distributed sensor is deployed in a borehole. In yet a further embodiment, the independent sensor is placed at a location within an area of particular interest in a borehole. In one particular embodiment, the parameter of interest is temperature, the FO distributed sensor is a FO-DTS, and the $\Delta T_1$ is the difference between the temperature measured by an independent temperature sensor and the temperature measured by a FO-DTS.

One embodiment of the present invention is a method for calibrating a FO distributed sensor comprising providing optical energy at the Stokes wavelength to FO distributed sensor; receiving backscattered signal at the Stokes wavelength and measuring; providing optical energy at the anti-Stokes wavelength to the FO distributed sensor; receiving backscattered signal at the anti-Stokes wavelength and measuring its intensity; calculating the attenuation ratio between the backscattered Stokes and anti-Stokes wavelengths at points along the FO distributed sensor using OTDR; repeating these steps at a different time; calculating the change in the attenuation ratio with time of the Stokes and anti-Stokes wavelengths; and applying said calculated change with time in attenuation ratio of the Stokes and anti-Stokes wavelengths to parameter measurements made using a FO distributed sensor. One particular embodiment of this method of calibration is where the parameter is temperature and the FO distributed sensor is a FO-DTS.

One embodiment of the present invention is a method of measuring temperature using a FO-DTS comprising providing optical energy at to the Stokes wavelength to the FO-DTS; receiving backscattered signal at the Stokes wavelength and measuring its intensity; providing optical energy at the anti-Stokes wavelength to the FO-DTS; receiving backscattered signal at the anti-Stokes wavelength and measuring its intensity; calculating the attenuation ratio between the backscattered signals at the Stokes and anti-Stokes wavelengths at points along the optical fiber using OTDR; repeating these steps at a different time; calculating the change in the attenuation ratio with time of the Stokes and anti-Stokes wavelengths; and applying the calculated change in attenuation ratio of the Stokes and anti-Stokes wavelengths to temperature measurements along the FO-DTS.

Another embodiment of the present invention is a method to calculate a corrected SAR comprising providing optical energy at the Stokes wavelength to an optical fiber; receiving backscattered signal at the Stokes wavelength and measuring its intensity; providing optical energy at the anti-Stokes wavelength to the optical fiber; receiving backscattered signal at the anti-Stokes wavelength and measuring its intensity; calculating the attenuation ratio between the backscattered Stokes and anti-Stokes wavelengths at points along the optical fiber using OTDR; repeating these steps at a different time; calculating the change in the attenuation ratio with time of the Stokes and anti-Stokes wavelengths; and multiplying a measured SAR by a correction factor, wherein the correction factor comprises the calculated change with time in attenuation ratio of the Stokes and anti-Stokes wavelengths.

One embodiment of the present invention is a method of determining temperature along a FO-DTS comprising the steps of: measuring the temperature along an FO-DTS; measuring the temperature at one or more locations along the FO-DTS using at least one independent temperature sensors, determining the difference $\Delta T_{1i}$ between the temperature measured using by each of the least one independent temperature sensor and the temperature measuring along the FO-DTS at the respective locations of the at least one independent temperature sensor, and adjusting the temperatures measured by the FO-DTS by $\Delta T_{1i}$, wherein i is the number of independent temperature sensors provided.

Another embodiment of the present invention is a method of calibrating a FO-DTS, comprising the steps of: measuring the temperature along an FO-DTS; measuring the temperature at one or more locations along the FO-DTS using at least one independent temperature sensors, determining the difference $\Delta T_{1i}$ between the temperature measured using by each of the least one independent temperature sensor and the temperature measuring along the FO-DTS at the respective locations of the at least one independent temperature sensor, and using $\Delta T_{1i}$ to calibrate temperature determined by the FO-DTS, wherein i is the number of independent temperature sensors provided.

The present invention includes a method of determining temperature comprising the steps of measuring the temperature along an FO-DTS; measuring the temperature at one or more locations along the FO-DTS using at least one fiber Bragg grating (FBG) in the FO-DTS, determining the difference $\Delta T_{2j}$ between the temperature measured using by each of the least one FBG and the temperature measured along the FO-DTS at each respective FBG location, and using $\Delta T_{2j}$ to adjust the temperature measured by the FO-DTS, wherein j is the number of FBG temperature sensors provided.

Another embodiment of the present invention is a method of calibrating a FO-DTS, comprising the steps of: measuring the temperature along an FO-DTS; using at least one FBG in the FO-DTS, measuring the temperature at one or more locations along the FO-DTS using at least one FBG, determining the difference $\Delta T_{2j}$ between the temperature measured using by each of the least one FBG and the temperature measuring along the FO-DTS at the respective locations of the at least one FBG, and using $\Delta T_{2j}$ to adjust temperatures measured using the FO-DTS, wherein j is the number of FBG temperature sensors provided.

An embodiment of the present invention is a method of determining temperature along a FO-DTS, comprising the steps of: measuring the temperature along FO-DTS; measuring the temperature at one or more locations along the FO-DTS using at least one independent temperature sensors, determining the difference $\Delta T_{1i}$ between the temperature measured by each of the least one independent temperature sensor and the temperature measured along the FO-DTS at the respective locations of the at least one independent temperature sensor, proving at least one FBG in the FO-DTS, measuring the temperature at one or more locations along the FO-DTS using at least one FBG, determining the difference $\Delta T_{2j}$ between the temperature measured using by each of the least one FBG and the temperature measuring along the FO-DTS at the respective locations of the at least one FBG, and adjusting the temperatures measured by the FO-DTS based on $\Delta T_{1i}$ and $\Delta T_{2j}$, wherein i is the number of independent temperature sensors and j is the number of FBG temperature sensors provided.

An embodiment of the present invention comprises a method of calibrating an optical fiber distributed sensor, comprising the steps of: measuring a parameter along a distributed sensor, measuring said parameter using at least one independent sensor; providing at least one FBG in the optical fiber distributed sensor and measuring said parameter using the at least one FBG; determining the difference $\Delta T_{1i}$ between the parameter measured using by each of the least one independent sensor and the parameter measuring along the FO distributed sensor at the location of the at least one independent sensor; determining the difference $\Delta T_{2j}$ between the parameter measured using by each of the least one FBG and the parameter measured along the FO distributed sensor at the location of the at least one FBG, and using $\Delta T_{1i}$ and using $\Delta T_{2j}$ to calibrate the parameter measurement as determined by the FO distributed sensor, wherein i is the number of independent temperature sensors and j is the number of FBG provided.

Another embodiment of the present invention is a method of measuring temperature along a FO-DTS, comprising providing optical energy into one end of the FO-DTS and transmitting in the forward direction; measuring the optical signal at locations i along the optical fiber distributed temperature sensor; determining the incremental loss variation in the forward direction; providing optical energy into the opposite end of the FO-DTS and transmitting in the reverse direction; measuring the optical signal at locations i along the FO-DTS; calculating the incremental loss variation at location i in the forward and reverse directions; and adjusting the temperatures measured by the FO-DTS by the incremental loss variation at location i to the temperature measured by the FO-DTS at location i.

Yet another embodiment of the present invention is a method of calibrating a FO distributed sensor, comprising providing energy into one end of an optical fiber and transmitting in the forward direction; measuring the optical signal at locations i along the FO distributed sensor, determining the incremental loss variation of a parameter of interest in the forward direction; providing optical energy into the opposite end of a FO distributed sensor and transmitting in the reverse direction; measuring the optical signal at locations i along the optical fiber distributed sensor, calculating the incremental loss variation of a parameter of interest in the reverse direction; and applying the incremental loss variation at location i to the measurements of said parameter of interest made by the FO distributed sensor at location i.

In further embodiments, the incremental loss variation is determined at the Stokes, anti-Stokes, or Stokes and anti-Stokes wavelengths, or with respect to the Stokes/anti-Stokes ratio.

Particular further embodiments of the above embodiments comprise providing the fiber optic distributed sensor in a borehole, wherein the parameter measured by the sensor is a borehole parameter, such as temperature, pressure, or fluid composition.

DETAILED DESCRIPTION OF THE INVENTION

A concern in using FO distributed sensors is the possible loss of calibration of the FO distributed sensor after deployment due to the change in the fiber characteristics, such as non-uniform attenuation of the fiber along the spectrum caused by micro-bending losses or hydrogen ingression. This concern is particularly heightened when considering long-term deployment of a FO distributed sensor in a borehole environment as changes in the FO cannot be easily monitored, hostile conditions such as high temperature and pressures occur in borehole environments, and the expense of replacing a FO can be significant. This concern can be minimized by methods of calibration to correct measurements made using an in situ FO distributed sensor. Such methods of calibration include calculating an expected change in SAR with time, providing at least one calibrating sensor or FBG along the FO distributed sensor, providing measurements from each end of a loop configuration FO distributed sensor, and combinations thereof.

Figure 1:
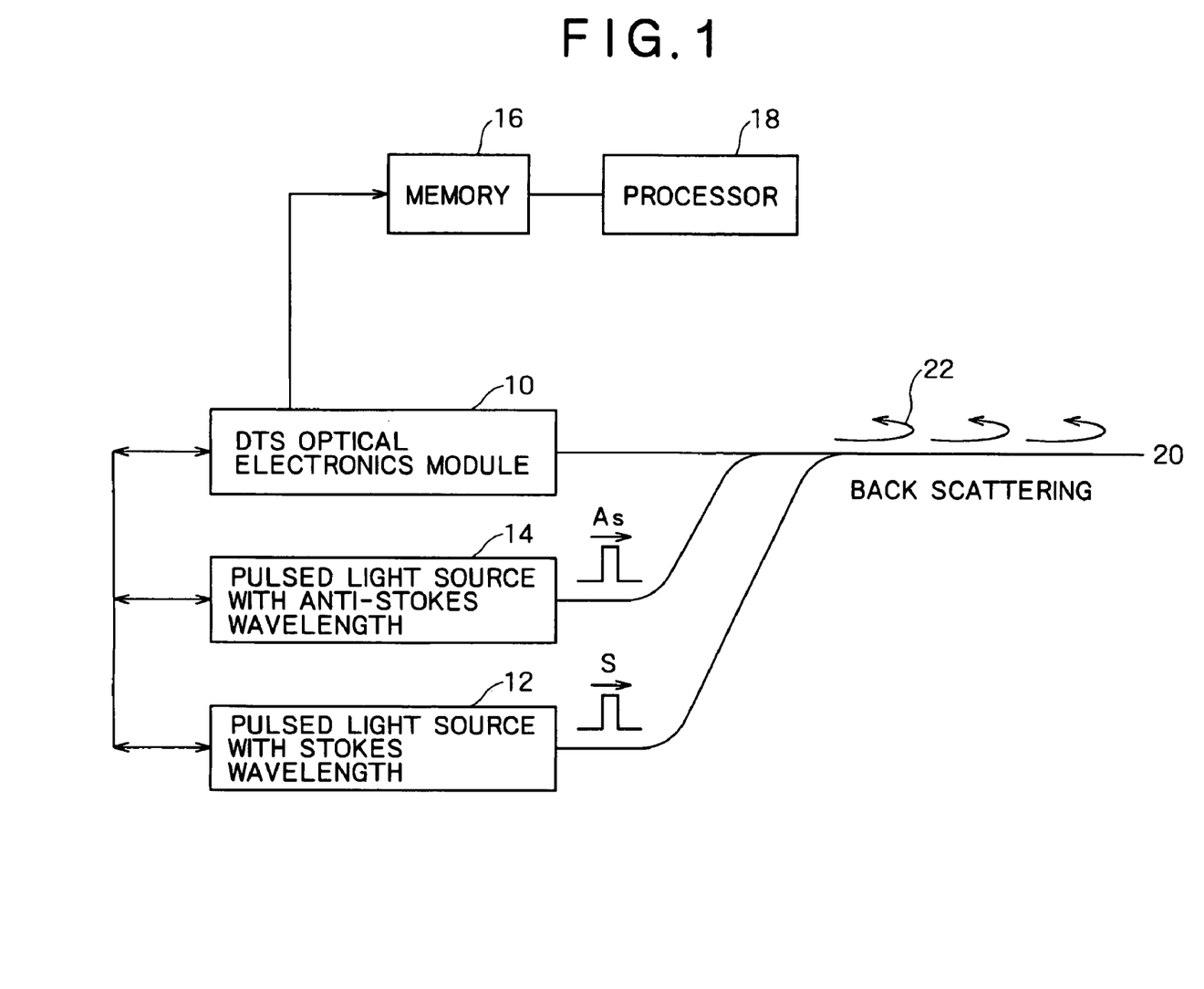
FIG. 1 is one embodiment of the present invention wherein light pulses at Stokes and anti-Stokes wavelengths are used.

Referring now to FIG. 1, a first embodiment according to the present invention is shown. While described in terms of a FO-DTS, it can be appreciated that the present method is applicable for other types of FO distributed sensors. The fiber optic distributed temperature sensor 20 is placed so as to pass through each area where temperature is to be measured. An optical energy source introduces optical energy into the FO-DTS and backscattered signal 22 is generated by the return of the optical energy along optical fiber. From the backscattered signal, the responses at the anti-Stokes wavelength and the Stokes wavelength are determined and temperature distribution along the FO-DTS is determined using Equation 1.

A DTS optical electronics module 10 is shown connected to a FO-DTS 20. A pulsed light source capable of outputting light at Stokes wavelength 12 is connected to the DTS optical electronic module 10 and FO-DTS 20. Similarly, a pulsed light source capable of outputting light at the anti-Stokes wavelength 14 is connected to DTS optical electronics module 10 and fiber optic distributed temperature sensor 20. While the present method is described in terms of temperature measurements and use of backscattered light at Stokes and anti-Stokes wavelengths, it can be appreciated that the present invention is also applicable to other distributed parameter measurements and other wavelength spectrums.

A pulse of light is provided from the Stokes wavelength light source 12 and the intensity of the backscattered light 22 at the Stokes wavelength is measured by the DTS optical electronics module 10. A pulse of light is provided from the anti-Stokes wavelength light source 14 and the intensity of the backscattered light 22 at the anti-Stokes wavelength is measured by the DTS optical electronics module 10. The order in which Stokes and anti-Stokes wavelengths are provided is unimportant. Using OTDR techniques, the DTS optical electronics module 10 calculates the attenuation ratio of Stokes versus anti-Stokes wavelengths at various points along the FO-DTS 20.

This attenuation ratio is stored in memory 16. The process is repeated again at a known later time and the attenuation ratio from the second event is recorded and stored in memory 16. The attenuation ratio from the second event is compared to the attenuation ratio from the first event using processor 18 and the change of the attenuation ratio with respect to time is determined.

Assuming the position of the FO-DTS remains stationary, such as when placed in a borehole for monitoring of downhole parameters, this change of the attenuation ratio with respect to time can be used to calibrate later measurements made using the FO-DTS. By multiplying the change in attenuation ratio with respect to time by the period of time that has passed since the initial measurements, a correction factor $\Delta AR$ can be determined.

Using this correction factor, a corrected SAR can be calculated as $$SAR_{corrected} = \Delta AR(SAR_{measured}) \qquad (2)$$

where $SAR_{measured}$ is the SAR measured at the later time. The corrected SAR can be used in Equation 1 to determine more accurately the temperature measured at later times by an in situ FO-DTS.

In another embodiment, a tunable light source provides light at Stokes and anti-Stokes wavelengths. In this embodiment, a single tunable light source is used to provide light at Stokes and anti-Stokes wavelengths rather than separate Stokes source 12 and anti-Stokes source 14. One such tunable pulsed light source is a pulsed tunable laser.

Another embodiment of the present invention comprises providing a FO distributed sensor and further providing at least one gauge capable of providing a calibrating measurement along the length of the DTS. This calibrating measurement can be performed by providing at least one fiber Bragg grating embedded in the FO distributed sensor or at least one independent sensor or combinations thereof. It is known to embed FBG in an optical fiber to sense parameters such as temperature or strain of the structure. Such a fiber optic grating system is described in U.S. Pat. No. 5,380,995 to Udd and Clark, incorporated herein in its entirety by reference. It is also known that the reflection wavelength of the grating changes with temperature due to the change in refractive index and grating spacing over temperature.

Distributed temperature sensors systems can use MMF or SMF; more commonly MMF is used. Single mode fibers have a core with a relatively small diameter and MMF have a relatively large core diameter. One embodiment of the present invention is a method of determining temperature measurements along a FO-DTS, comprising use of at least one FBG. A single and easily discernable temperature peak will be indicated by the FBG if the fiber optic distributed temperature sensor is SMF. If the fiber optic distributed temperature sensor is MMF, multiple peaks will be indicated by the FBG sensor, yielding a less discernable temperature reading. The present invention contemplates use of a SMF, a MMF, or a combination thereof.

Figure 2:
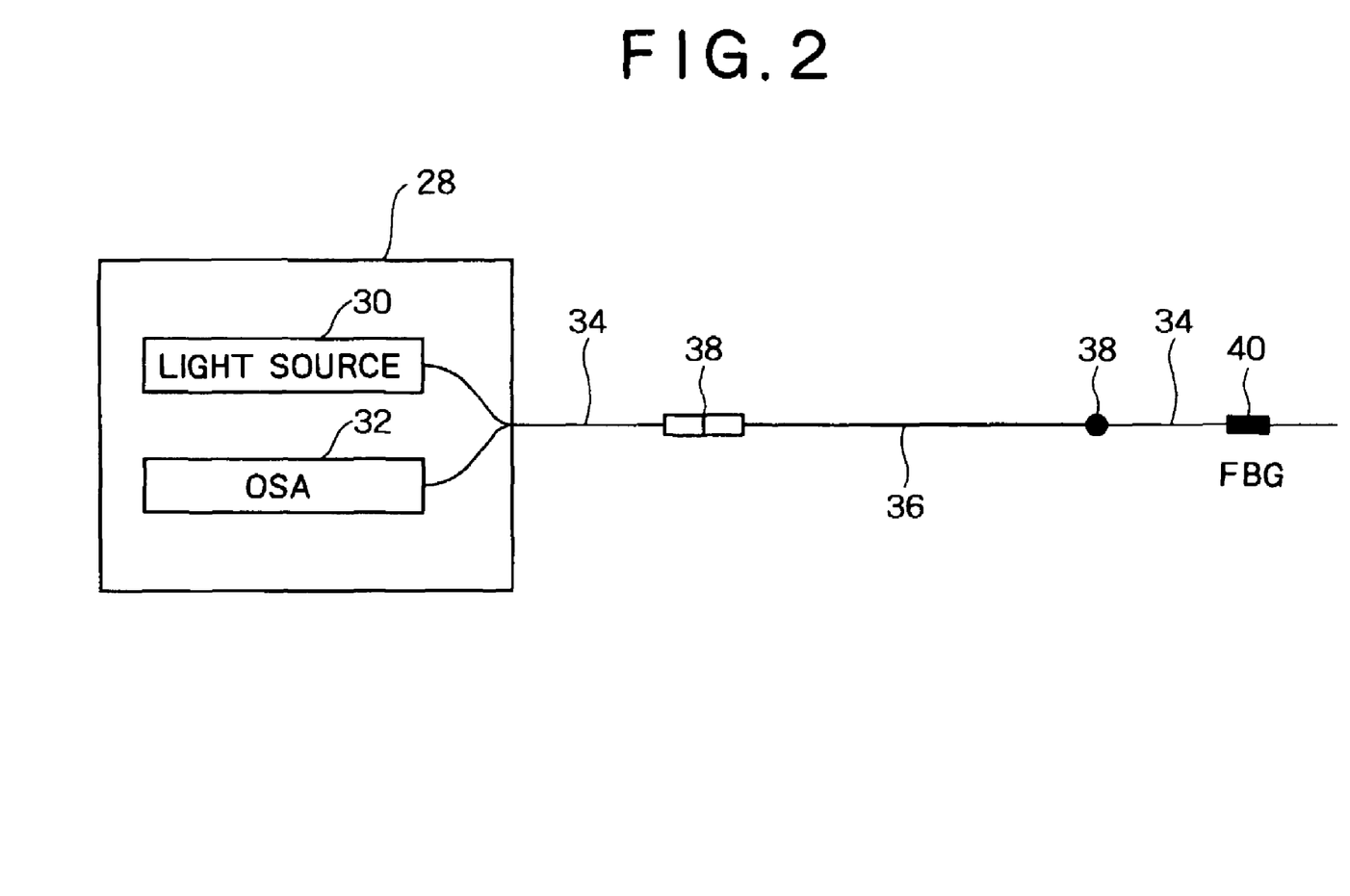
FIG. 2 is an embodiment of the present invention wherein a FBG is provided in a FO-DTS.

As shown in FIG. 2, one particular embodiment is to provide a FO-DTS comprising a segment of SMF 34 and a segment of MMF 36, wherein at least one FBG is placed in the SMF 34. This configuration combines the advantages of using MMF and SMF. Referring to FIG. 2, an integration system 28 comprising a light source 30 and a spectral analyzer 32 are connected to a SMF 34. The light source 30 may be, e.g., a LED, a tunable laser, or a laser diode while the spectral analyzer 32 may be, e.g., a Fabry-Perot filter, an acouto-optical filter or an optical spectral analyzer (OSA). A MMF 36 is connected to the SMF 34. Methods of making connections 38 between the MMF and SSF such as splicing or using connectors are known. At least one FBG 40 is placed in the SMF 34.

Two tests were performed to compare the performance of a SMF with the performance of a SMF with MMF added between the interrogation system 28 and the FBG sensor 40.

Figure 3:
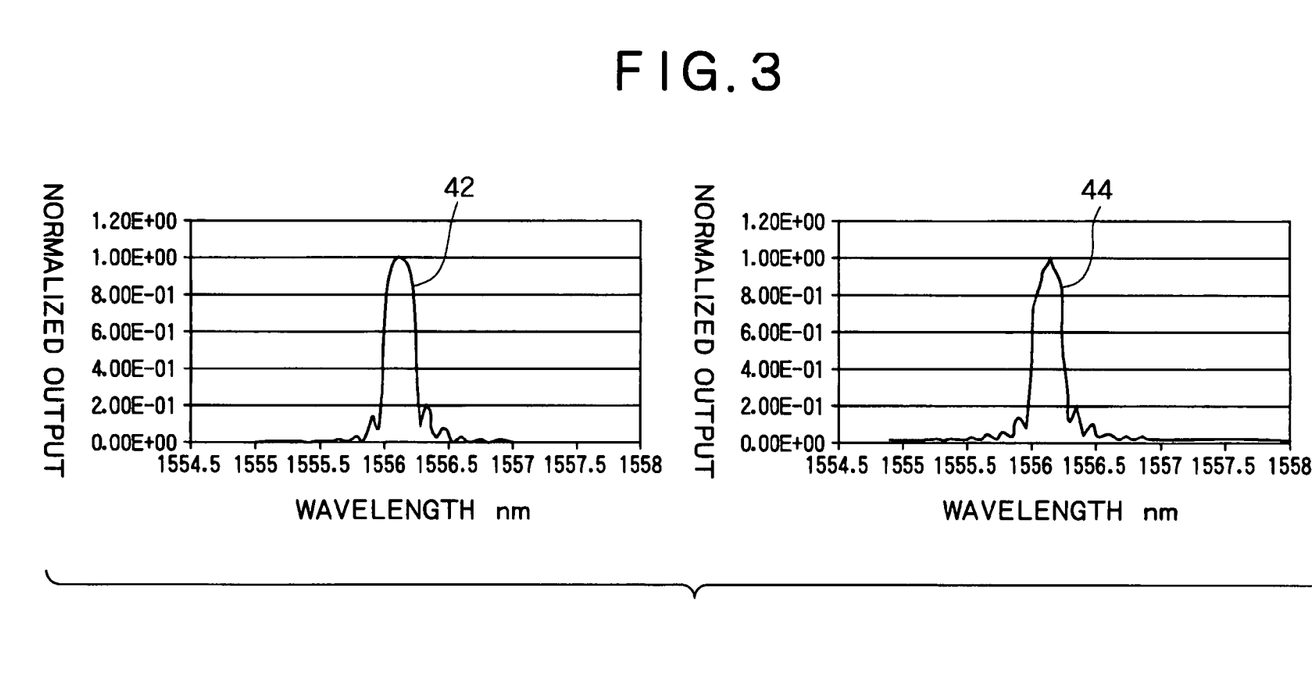
FIG. 3 shows normalized spectrum obtained using a FBG in single mode optical fiber versus normalized spectrum obtained using a FBG in a multimode optical fiber.

FIG. 3 shows the normalized spectrum reflected in one test where optical energy was input into the cable and a spectrum measured using a FBG 40 for a first case 42 comprising a SMF with FBG and a second case 44 comprising a SMF with MMF inserted between the SMF and the FBG. FIG. 3 indicates there was no remarkable degradation of on the shape of the spectrum or the change in center wavelength.

Figure 4:
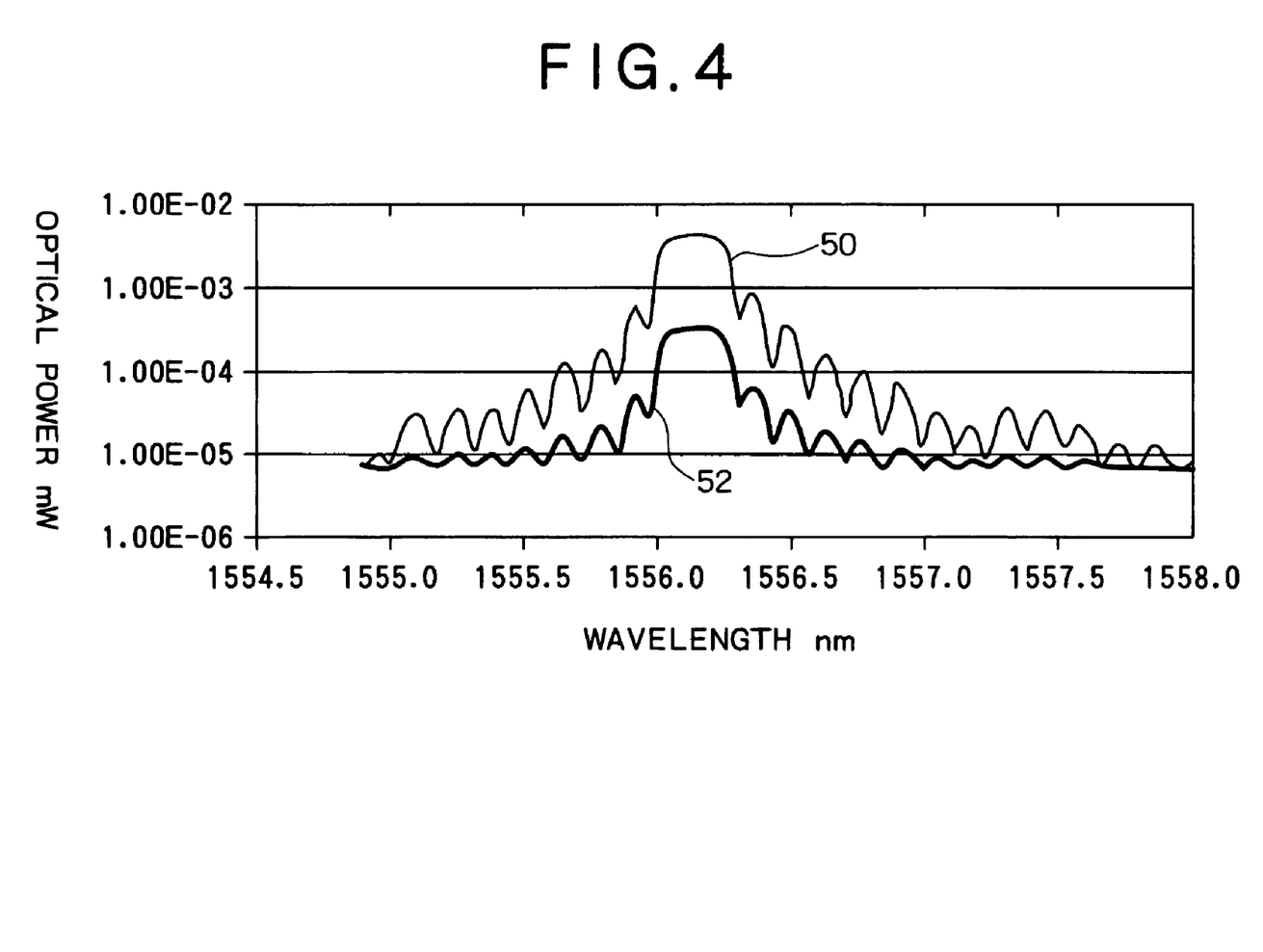
FIG. 4 shows the spectra reflected in an example case by the FBG using single mode optical fiber and multimode optical fiber.

In another test, optical energy was input into the cable and a spectrum measured. FIG. 4 shows the spectrum reflected by the FBG in the two cases. In a first case 50, FBG 40 was provided in the SMF 34, which connected directly to an integration system 28 comprising a light source 30 and an OSA 32 and a spectrum was measured. In a second case 52, FBG 40 was provided in the SMF 34, which connected to MMF 36 that was connected to an integration system 28 comprising a light source 30 and an OSA 32 and a spectrum measured. For these cases, the difference in power for the SMF spectrum 50 and the SMF with MMF spectrum 52 was shown to be about 10 dB at the FBG center wavelength. Connection loss was estimated to be approximately 2.5 dB.

Figure 5:
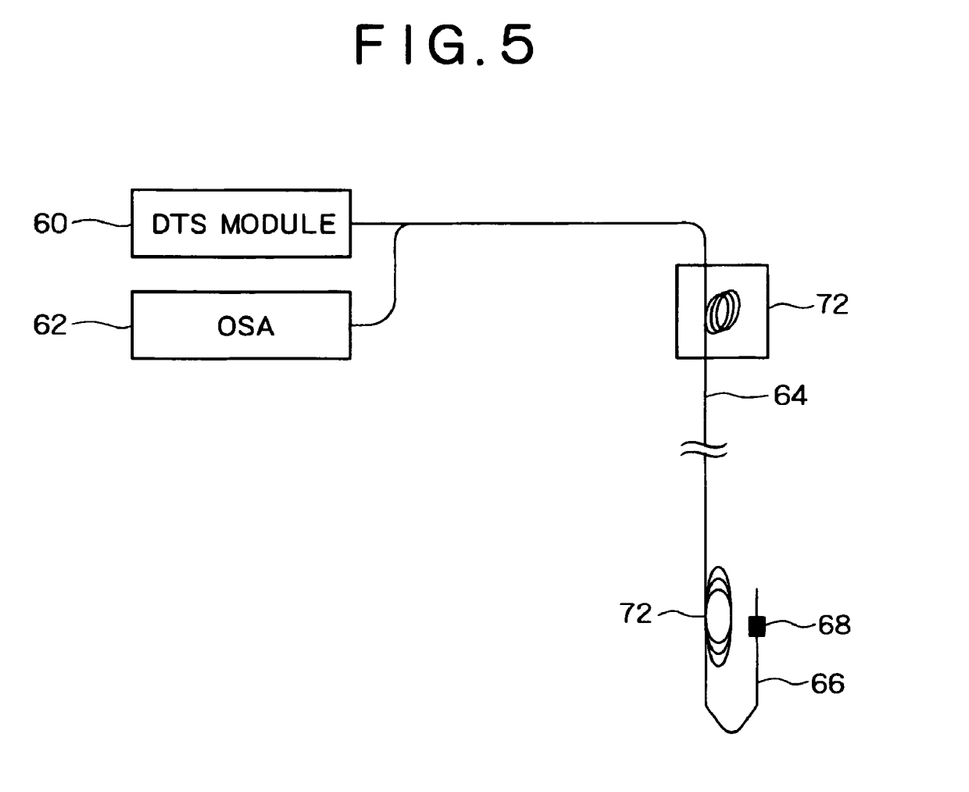
FIG. 5 shows one possible configuration for a FO-DTS system with downhole calibration utilizing FBG.

One possible configuration for a DTS system with downhole calibration utilizing FBG is shown in FIG. 5. The distributed temperature sensor system comprises DTS optical electronics module 60, an OSA 62, and a FO-DTS 64 which can be either MMF or SMF. If the FO distributed sensor is MMF, a length of SMF 66 may be provided at the end of the MMF cable. Preferably at least one FBG 68 is provided. If a SMF length 66 is provided in conjunction with MMF, preferably the FBG 68 is provided on the SMF length. It should be appreciated however that the invention encompasses providing the at least one FBG 68 on the MMF length as well as the SMF length and encompasses providing the at least one FBG 68 on a MMF without associated use of SMF. Each at least one FBG provides a measurement of temperature at its particular location.

An independent temperature sensor 72 is used to measure the temperature at a particular location. This independent temperature sensor may be a fiber optic temperature sensor or another type of temperature sensor such as an electrical quartz sensor or a sensor comprising a crystal quartz gauge. In particular situations where a highly precise or highly accurate temperature measurement is desired, gauges of the type capable of providing a more precise and accurate temperature measurement than a DTS can be provided. The temperature reading of the independent temperature sensor 72 and the temperature reading of the optical fiber distributed temperature sensor 64 at the location of the independent temperature sensor 72 can be compared and the difference calculated as $\Delta T_1$. This difference can be used to calibrate the FO-DTS 64 along the length of the FO-DTS 64 by applying $\Delta T_1$ to the temperature readings obtained by the distributed temperature sensor.

By providing at least one FBG 68, a temperature correction can be determined at the location of the at least one FBG by calculating the difference $\Delta T_2$ of the FBG temperature measurement and the temperature measurement of the FO-DTS at that location. Another method is to calibrate the FO-DTS by applying the average of $\Delta T_1$ and $\Delta T_2$ along the length between the at least two sensors. Such an average may be an arithmetic average or a weighted average based on relative location of the temperature reading along the DTS. Alternatively $\Delta T_1$ and $\Delta T_2$ may be applied spatially along the DTS or either $\Delta T_1$ or $\Delta T_2$ may be applied at various locations along the DTS. In particular $\Delta T_1$ and $\Delta T_2$ may be applied between the locations of the independent sensors or the FBG or at known locations of physical features such as splices, connection or bends.

While the example shown in FIG. 5 comprises a FBG and two independent sensors, the present invention also contemplates use of multiple FBG and multiple independent sensors along a FO-DTS. In such a case, $\Delta T_{1i}$ represent the difference in the temperature measurements between ith independent temperature sensor and the FO-DTS at the location of the ith independent sensor, and $\Delta T_{2j}$ represent the difference in the temperature measurements between the jth FBG and FO-DTS at the location of the jth FBG. Calibration of the FO-DTS can be made by applying an arithmetic or weighted average of $\Delta T_{1i}$ and $\Delta T_{2j}$; applying a function of $\Delta T_{1i}$ and $\Delta T_{2j}$; or spatially applying $\Delta T_{1i}$ and $\Delta T_{2j}$ based on known characteristics of the FO-DTS such as the locations of splices in the optical fiber.

In an example of one embodiment of the present invention, a fiber optic DTS and three independent temperature gauges were deployed in a horizontal well, the well having both a vertical section and a horizontal section. The vertical section was completed with casing and gravel pack tubing was used in the horizontal section. Packers and flow control valves were used to isolate the horizontal section into three zones. A FO-DTS was deployed along the entire length of the borehole. This example used a single-ended configuration for the FO-DTS although a loop configuration could have been used. An electrical quartz pressure and temperature gauge was provided in each of the three horizontal zones. In this example, the electrical quartz pressure and temperature gauges were associated with the flow control devices, although such association is not a limitation. Other gauge configurations and placements are contemplated within the scope of the present invention.

Figure 6:
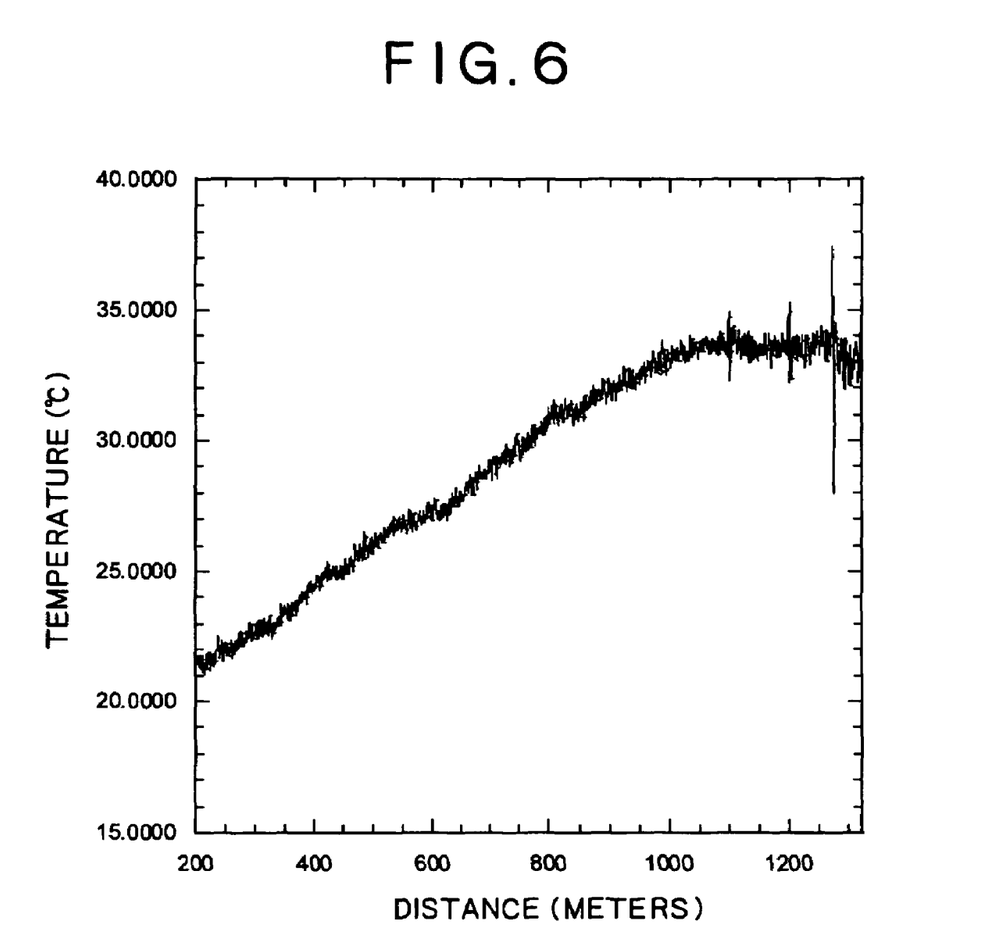
FIGS. 6, 7, and 8 contain data showing temperature and error versus distance for an example deployment of a FO-DTS in a borehole.

FIG. 6 shows the temperature measured by the DTS in this example versus the distance into the borehole from the surface. The horizontal section can be roughly correlated with portion of FIG. 6 where the temperature profile is approximately flat, from approximately 1050 meters to total depth. In this section of the temperature profile, three temperature spikes can be seen which correlate to three splices in the FO-DTS. While the location of splices along the length of a sensor can be noted during deployment for later consideration, these splices nevertheless contribute to loss of calibration of the distributed sensor in the localized areas near the splices. Similar localized areas of calibration loss may occur near bends, strains or other deleterious influences affecting the optical fiber distributed sensor.

Figure 7:
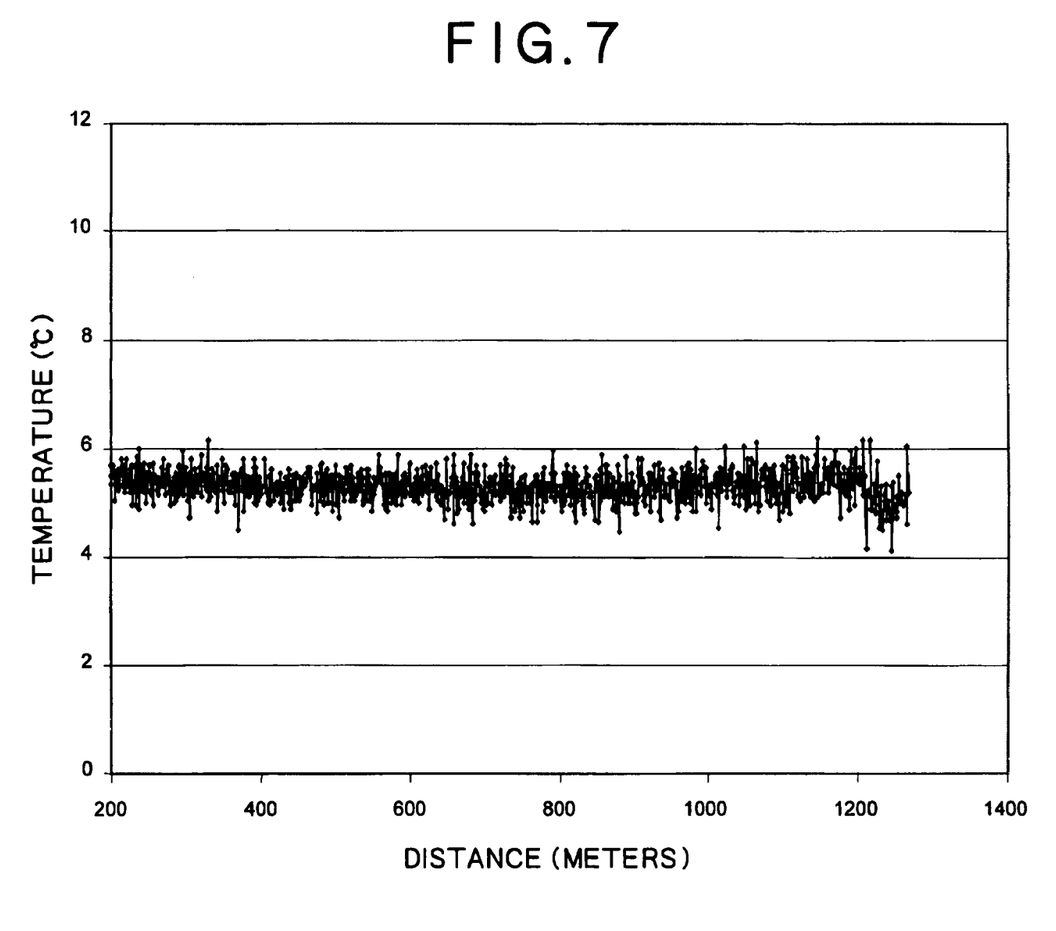

FIG. 7 shows a relatively constant offset of approximately 6° C. throughout the entire DTS profile as compared to a baseline temperature reference as measured in controlled conditions or provided as manufacturer's information. This represents a substantial variation as under ideal conditions a FO-DTS can provide accuracy within approximately 1° C. Use of independent temperature sensors permitted corrections for this offset. The temperature was measured using an independent electrical temperature gauge near 1000 meters with a precision of 0.1 degree C. or less and a correction calculated as the difference between the temperature measurement of the independent gauge and the temperature measured by the FO-DTS. The entire DTS profile was then offset with this correction and also set to the correct temperature as determined by the downhole temperature gauge.

Figure 8:
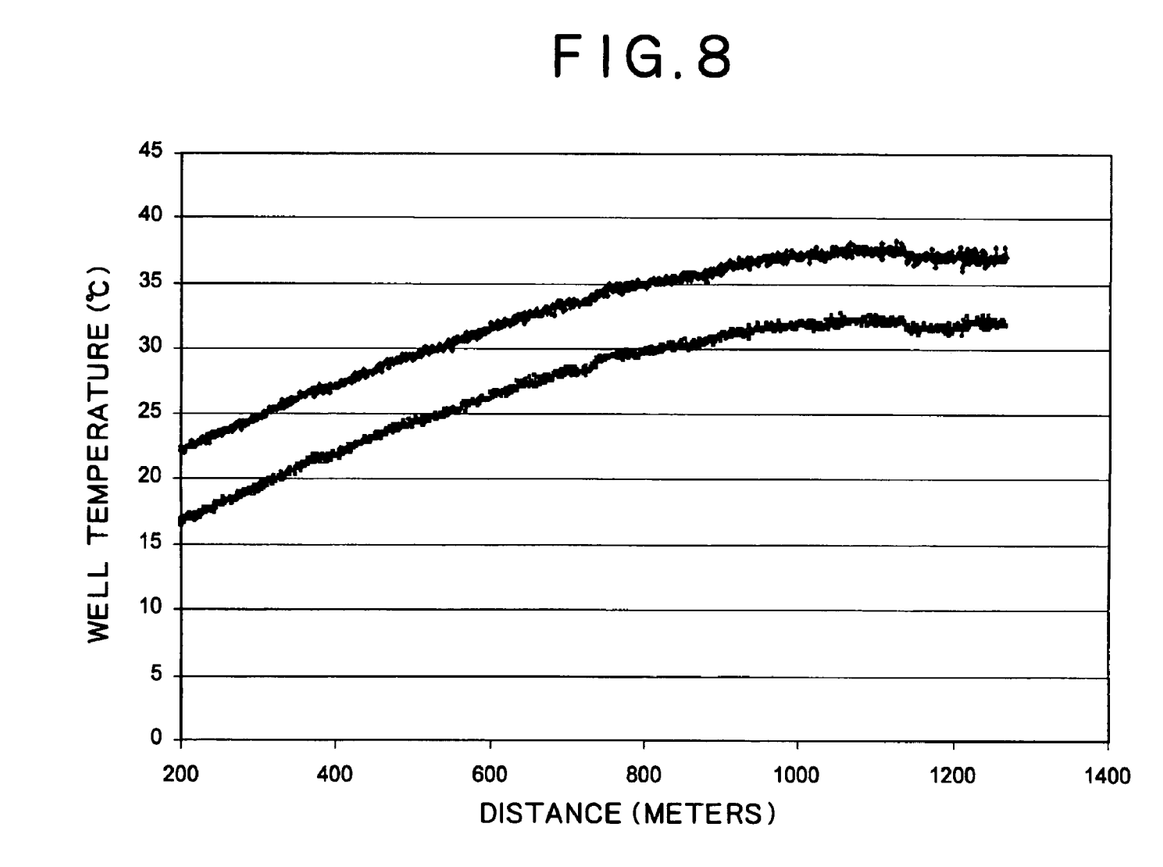

FIG. 8 shows the offset of DTS measurements taken at two different times for the portion of the DTS in the borehole. Three electrical quartz pressure and temperature gauges were used to measure temperature in the borehole at locations near the splices in the FO-DTS, as indicated by the spikes in the DTS temperature measurements in FIG. 6. These gauges had an accuracy of approximately 0.1° C., thereby permitting correction of the FO-DTS measurements to an level within the accuracy of FO-DTS systems.

An embodiment of the present invention contemplates using temperature measurements from independent temperature gauges both to correct for gross temperature errors from physical traumas such as splices and optical fiber loss in FIG. 6 and to increase the accuracy of the DTS measurement, across the entire fiber length, to the level of the independent reference gauge, that is to a level substantially better than 1 degree C. The present invention applies to both single ended and loop DTS configurations.

Another embodiment of the present invention is a method of obtaining corrected temperature measurements along a FO-DTS deployed in a loop configuration, comprising use of measurements from both ends of the optical fiber. This method comprises estimating the cumulative error along an optical fiber utilizing measurements taken from back-scattered signal (light) from both ends of the fiber loop.

In general along FO distributed sensors, the backscattered energy $E_i$ at a point i is:

$$E_i = E_{input} F_i \exp\left(\sum_{n=0}^{i} R\right) \quad (3)$$

where $E_{input}$ is the input power, $F_i$ is the coefficient of backscattering at point i and is a known function of temperature for various optical fibers, and $$\sum_{n=0}^{i} R$$

is the additive error along the distributed fiber from the input point to i. The input power, $E_{input}$, can be measured. Also, backscattered signal at particular wavelengths can be measured at the points along the FO distributed sensor. Alternatively, the ratio of particular wavelengths, such as the SAR, can be measured at points along the FO distributed sensor. Typically this measurement point is the energy input point. After energy $E_{input}$ is input, backscattered energy $E_i$ occurs and signals from the backscattered energy can be measured; the backscattered signal measured at the input point is designated as $S_i = \ln(E_i)$, for any point i. This measured backscattered signal from point i includes the signal $S_i$ at point i and the additive error or loss of signal along the distributed fiber from the measurement point to i. This embodiment of the invention comprises a method to estimating the additive error along the distributed fiber to point i and calculating the true signal $S_i$ at point i using this estimation and the measured backscattered signal.

The relationship between backscattered signal S and input energy is known as:

$$S_i = \ln(E_{input} F_i) \quad (4)$$

where $S_i$ is the backscattered energy at i and $F_i$ is the coefficient of backscattering at point i. Using a method of the present invention to determine $S_i$, and measuring $E_{input}$, $F_i$ can be calculated. Then $F_i$ can be used with known manufacture or baseline reference functions for various types and configurations of optical fiber to determine the temperature at point i.

One method of the present invention comprises providing a pulse of optical energy at one end of the loop, end Y, and recording backscattered wavelengths at points i along the optical fiber. As an example, this methodology is explained in terms of measuring the Stokes and anti-Stokes wavelengths in from each end of the loop configuration optical fiber. It is expressly contemplated within the scope of the present invention that this methodology applies to other types of measurements that may demonstrate cumulative error such as temperature measurements, measurements of other wavelengths, or measurements of wavelength-related variables such as SAR. It is also contemplated that the present invention may be used with measurements of the Stokes wavelength only, measurement of the anti-Stokes wavelength only, or the SAR only.

The Stokes signal contribution is designated at S and the anti-Stokes signal contribution is designated as A. This method comprises providing optical energy to one end, end Y, of a loop optical fiber sensor. The backscattered signals received at end Y are recorded, and the intensity of the signals or the loss variation between one point i and the next point i+1 is used to populate two arrays: Sy for the signal at the Stokes wavelength and Ay for the signal at the anti-Stokes wavelength. Then optical energy is provided at the other end of the optical fiber loop, end Z, and recording backscattered wavelengths at points along the optical fiber. The backscattered signals received at end Z are recorded, and the intensity of the signals or the loss variation between one point i and the next point i+1 is used to populate two arrays: Sz for the signal at the Stokes wavelength and Az for the signal at the anti-Stokes wavelength.

The loss variation between one point, i, and the next point, i+1, are represented by an array $E_S$ and an array $E_A$ for Stokes and anti-Stokes signals, wherein E represents the difference in intensity or the loss between points i and i+1.

For arrays of k points, $$Sy_i = S_i + \sum_{j=0}^{i} E_{S_j} \quad (5)$$

$$Sz_i = S_i + \sum_{j=i+1}^{k} E_{S_j} \quad (6)$$

$$Ay_i = AS_i + \sum_{j=0}^{i} E_{A_j} \quad (7)$$

$$Az_i = AS_i + \sum_{j=i+1}^{k} E_{A_j} \quad (8)$$

At a given point i along the optical fiber, assuming equivalent optical energy input at ends Y and Z, the difference between the Stokes measurement determined from end Y and the Stokes measurement determined from end Z is:

$$Ds_i = Sy_i - Sz_i = \sum_{j=0}^{i} E_{S_j} - \sum_{j=i+1}^{k} E_{S_j} \quad (9)$$

and the difference between the anti-Stokes measurement determined from end Y and the anti-Stokes measurement determined from end Z is $$Da_i = Ay_i - Az_i = \sum_{j=0}^{i} E_{A_j} - \sum_{j=i+1}^{k} E_{A_j} \quad (10)$$

The increment of each element gives the double of the loss contribution for each point:

$$\Delta s_i = Ds_i - Ds_{i-1} = \sum_{j=0}^{i} E_{S_j} - \sum_{j=i+1}^{k} E_{S_j} - \sum_{j=0}^{i-1} E_{S_j} + \sum_{j=i}^{k} E_{S_j} = 2E_{S_j} \quad (11)$$

and $$\Delta a_i = Da_i - Da_{i-1} = \sum_{j=0}^{i} E_{A_j} - \sum_{j=i+1}^{k} E_{A_j} - \sum_{j=0}^{i-1} E_{A_j} + \sum_{j=i}^{k} E_{A_j} = 2E_{A_j} \quad (12)$$

This enables the estimation of the signal contribution due to temperature only as:

$$S_i = Sy_i - \sum_{j=0}^{i} \frac{\Delta s_j}{2} \quad (13)$$

and $$A_i = Ay_i - \sum_{j=0}^{i} \frac{\Delta a_j}{2} \quad (14)$$

With the loss contribution to the signal extracted from both Stokes and anti-Stokes signals, the SAR can be calculated and the temperature at each point can be estimated using Equation 1 without needing to know the differential loss factor for the two wavelengths. The same method could be used to correct for the influence of loss for data already processed to obtain the temperature information, provided the error is cumulative.

Similarly, the present invention contemplates direct measurement of the SAR in the forward and reverse directions and estimation of the signal loss contribution owing to temperature as follows:

For arrays of k points, $$SARy_i = SAR_i + \sum_{j=0}^{i} E_{SAR_j} \quad (15)$$

$$SARz_i = SAR_i + \sum_{j=i+1}^{k} E_{SAR_j} \quad (16)$$

The increment of each element gives the double of the loss contribution for each point:

$$\Delta SAR_i = DSAR_i - DSAR_{i-1} = \quad (17)$$

$$\sum_{j=0}^{i} E_{SAR_j} - \sum_{j=i+1}^{k} E_{SAR_j} - \sum_{j=0}^{i-1} E_{SAR_j} + \sum_{j=i}^{k} E_{SAR_j} = 2E_{SAR_j}$$

This enables the estimation of the signal contribution due to temperature only as:

$$SAR_i = SARy_i - \sum_{j=0}^{i} \frac{\Delta SAR_j}{2} \quad (18)$$

Figure 9:
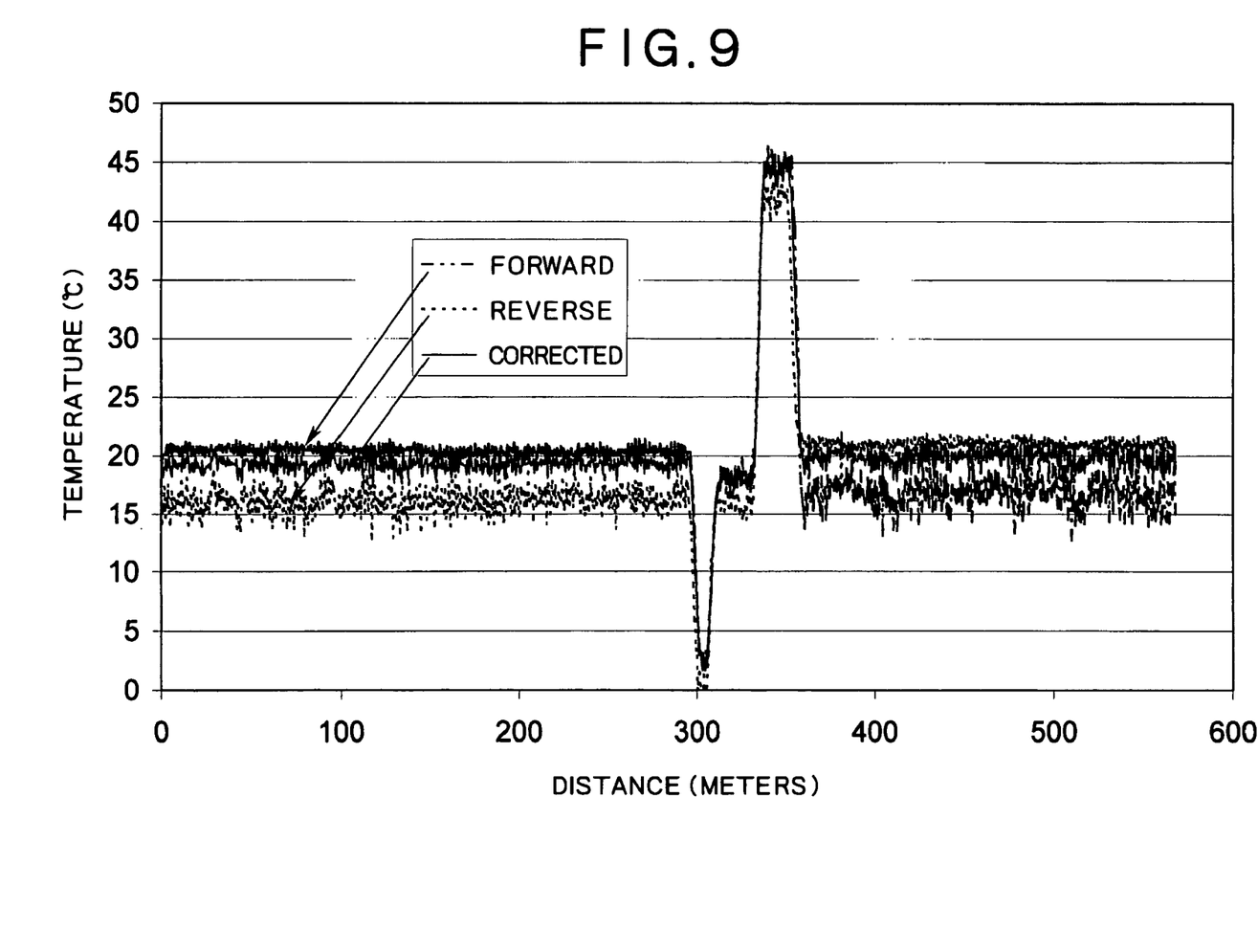
FIG. 9 shows example temperature data collected in both the forward and reverse direction and data corrected for incremental loss variations between Stokes and anti-Stokes wavelengths.

FIG. 9 shows an example of data collected from energy input at one end of an optical fiber (referred to as the forward direction) and energy input at the opposite end of the optical fiber (referred to as the reverse direction) and the corrected data using the present method. In this case, the fiber passes through cold water at approximately 305 m along its length and the fiber passes through a hot oven at approximately 350 m along its length.

Localized regions of high loss were induced by coiling the fiber around a pencil at approximately 325 m and approximately 360 m along the fiber length, just before and after the oven. The forward and backward data do not coincide due to the difference in attenuation for the Stokes and anti-Stokes data, mainly at the high loss points. The data were corrected even without the use of the Stokes and anti-Stokes raw data.

It is contemplated within the scope of this invention that the embodiments of the invention are combinable in complementary configurations. For example, in conjunction with providing light at Stokes and anti-Stokes wavelengths, measuring the backscattered signals, populating arrays and calculating errors, an independent temperature measurement could be provided to calibrate the calculated error at the independent temperature measurement location. The present invention contemplates measuring temperature or calibrating borehole properties by providing such multiple embodiments simultaneously or at different times in a borehole. The present invention further contemplates use of FO-DTS comprising SMF, MMF, or a combination of SMF and MMF.

There have been described and illustrated herein several embodiments of methods and apparatus for measuring differential temperature with fiber optic sensors distributed. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method of determining temperature along a fiber optic distributed temperature sensor, comprising the steps of:
    a) providing optical energy into one end Y of a fiber optic distributed temperature sensor and transmitting in the forward direction;
    b) measuring the backscattered signal at Stokes wavelength, Sy;
    c) measuring the backscattered signal at anti-Stokes wavelength, Ay;
    d) providing optical energy into the other end Z of the fiber optic distributed temperature sensor and transmitting in the reverse direction;
    e) measuring the backscattered signal at the Stokes wavelength, Sz;
    f) measuring the backscattered signal at the anti-Stokes wavelength, Az;
    g) determining the difference between the backscattered signal at the Stokes wavelength in the forward and the reverse directions for any given point i along the sensor, Ds;
    h) determining the difference between the backscattered signal at the anti-Stokes wavelength in the forward and the reverse directions for the given point i along the sensor, Da;
    i) determining the incremental value at a distance for the difference between the backscattered signal at the Stokes wavelength in the forward and the reverse directions for the given point i along the sensor, Δs;

j) determining the incremental value at a distance for the difference between the backscattered signal at the anti-Stokes wavelength in the forward and the reverse directions for the given point i along the sensor, Δa;

k) correcting the backscattered signal at the Stokes wavelength at the given point i by $$S_i = Sy_i - \sum_{j=0}^{i} \frac{\Delta s_j}{2}$$

or $$S_i = Sz_i - \sum_{j=0}^{i} \frac{\Delta s_j}{2}$$

for the forward and reverse directions, respectively;

l) correcting the backscattered signal at the anti-Stokes wavelength at the given point i by $$A_i = Ay_i - \sum_{j=0}^{i} \frac{\Delta a_j}{2}$$

or $$A_i = Az_i - \sum_{j=0}^{i} \frac{\Delta a_j}{2}$$

for the forward and reverse directions, respectively; and m) determining the temperature using the corrected signals at the Stokes wavelength (S) and the anti-Stokes wavelength (A).

2. The method as claimed in claim 1, wherein a tunable light source provides the optical energy at Stokes wavelength and the optical energy at anti-Stokes wavelength.

3. The method as claimed in claim 1, wherein the fiber optic distributed temperature sensor is deployed in a borehole.

4. The method as claimed in claim 1, wherein the fiber optic distributed temperature sensor comprises a fiber Bragg grating.

5. A method of determining temperature along a fiber optic distributed temperature sensor, comprising the steps of:

a) providing optical energy into one end Y of a fiber optic distributed temperature sensor and transmitting in the forward direction;

b) measuring the backscattered signal at Stokes wavelength, Sy;

c) measuring the backscattered signal at anti-Stokes wavelength, Ay;

d) providing optical energy into the other end Z of the fiber optic distributed temperature sensor and transmitting in the reverse direction;

e) measuring the backscattered signal at the Stokes wavelength, Sz;

f) measuring the backscattered signal at the anti-Stokes wavelength, Az;

g) determining the Stokes/anti-Stokes ratio from end Y, SARy;

h) determining the Stokes/anti-Stokes ratio from end Z, SARz;

i) determining the difference between the Stokes/anti-Stokes ratio in the forward and the reverse directions for any given point i along the sensor, DSAR;

j) determining the incremental value at a distance for the difference between the Stokes/anti-Stokes ratio in the forward and the reverse directions for the given point i along the sensor, ΔSAR;

k) correcting the Stokes/anti-Stokes ratio at the given point i by $$SAR_i = SARy_i - \sum_{j=0}^{i} \frac{\Delta SAR_j}{2}$$

or $$SAR_i = SARz_i - \sum_{j=0}^{i} \frac{\Delta SAR_j}{2}$$

for the forward and reverse directions, respectively; and l) determining the temperature using the corrected Stokes/anti-Stokes ratio, SAR.

* * * * *